(12) United States Patent
Brunner et al.

(10) Patent No.: US 9,322,107 B2
(45) Date of Patent: Apr. 26, 2016

(54) POLYMERS HAVING TERMINAL AMINO GROUPS AND USE THEREOF AS ADDITIVES FOR ZINC AND ZINC ALLOY ELECTRODEPOSITION BATHS

(75) Inventors: Heiko Brunner, Berlin (DE); Lars Kohlmann, Berlin (DE); Ellen Habig, Berlin (DE); Bjorn Dingwerth, Berlin (DE); Lukas Bedrnik, Tanvald (CZ)

(73) Assignee: ATOTECH DEUTSCHLAND GMBH, Berlin (DE)

( * ) Notice: Subject to any disclaimer, the term of this patent is extended or adjusted under 35 U.S.C. 154(b) by 1019 days.

(21) Appl. No.: 13/394,405

(22) PCT Filed: Sep. 3, 2010

(86) PCT No.: PCT/EP2010/062954
§ 371 (c)(1),
(2), (4) Date: Mar. 6, 2012

(87) PCT Pub. No.: WO2011/029781
PCT Pub. Date: Mar. 17, 2011

(65) Prior Publication Data
US 2012/0160698 A1 Jun. 28, 2012

(30) Foreign Application Priority Data
Sep. 8, 2009 (EP) .................... 09169786

(51) Int. Cl.
C25D 3/56 (2006.01)
C25D 3/22 (2006.01)
C08G 71/02 (2006.01)

(52) U.S. Cl.
CPC ............ C25D 3/565 (2013.01); C08G 71/02 (2013.01); C25D 3/22 (2013.01)

(58) Field of Classification Search
CPC ........... C25D 3/22; C25D 3/365; C25D 3/565
USPC ......... 205/244, 305, 311, 312, 313, 314, 245, 205/246
See application file for complete search history.

(56) References Cited

U.S. PATENT DOCUMENTS

| | | | |
|---|---|---|---|
| 3,884,774 A | 5/1975 | Kessler | |
| 3,960,677 A | 6/1976 | Hildering et al. | |
| 4,045,306 A | 8/1977 | Senge et al. | |
| 4,157,388 A | 6/1979 | Christiansen | |
| 4,183,958 A | 1/1980 | Brown et al. | |
| 4,643,805 A * | 2/1987 | Popescu ................ | 205/245 |
| 5,405,523 A * | 4/1995 | Eckles .................. | 205/245 |
| 5,435,898 A | 7/1995 | Commander et al. | |
| 6,436,269 B1 | 8/2002 | Opaskar et al. | |
| 6,652,728 B1 * | 11/2003 | Sonntag et al. ........ | 205/143 |
| 2008/0223726 A1 | 9/2008 | Eckles et al. | |
| 2008/0223729 A1 | 9/2008 | Gomez | |
| 2009/0205969 A1 | 8/2009 | Jimenez et al. | |
| 2010/0155257 A1 * | 6/2010 | Brunner et al. ........ | 205/246 |
| 2010/0236936 A1 | 9/2010 | Brunner et al. | |

FOREIGN PATENT DOCUMENTS

| | | |
|---|---|---|
| DE | 25 25 264 C2 | 12/1976 |
| DE | 30 03 978 A1 | 8/1981 |
| DE | 10 2005 060 030 A1 | 6/2007 |
| EP | 1 114 206 A1 | 7/2001 |
| EP | 1 201 789 A2 | 5/2002 |
| EP | 1 315 849 A1 | 6/2003 |
| JP | 2001-226793 A | 8/2001 |
| WO | 2004/044269 A2 | 5/2004 |
| WO | 2007/025606 A1 | 3/2007 |
| WO | 2007/147604 A2 | 12/2007 |
| WO | 2007/147605 A2 | 12/2007 |

* cited by examiner

Primary Examiner — Edna Wong
(74) Attorney, Agent, or Firm — Mintz Levin Cohn Ferris Glovsky and Popeo, P.C.; Peter F. Corless, Esq.; Daniel W. Clarke

(57) ABSTRACT

Additives for electrolyte baths for the electrodeposition of zinc or zinc alloy layer are described. The additives are polymers with terminal amino groups. These polymers are obtainable by reaction of at least one diamino compound (having two tertiary amino groups) with at least one di(pseudo)halogen compound, wherein the diamino compound is used in stoichiometric excess. The additives effect, in particular, a very little formation of bubbles and only few burnings as well as a uniform distribution of layer thickness in the electrodeposition of zinc or zinc alloy layers.

15 Claims, No Drawings

POLYMERS HAVING TERMINAL AMINO GROUPS AND USE THEREOF AS ADDITIVES FOR ZINC AND ZINC ALLOY ELECTRODEPOSITION BATHS

FIELD OF THE INVENTION

The invention relates to additives for electrolyte baths for electrodeposition of a zinc or zinc alloy layer. The additives are polymers having terminal amino groups. The additives particularly effect a low formation of bubbles and few burnings as well as a uniform distribution of layer thickness during electrodeposition of zinc or zinc alloy layers.

BACKGROUND OF THE INVENTION

Since many years, N,N'-Bis(dialkylaminoalkyl)urea-α,ω-dihalogenalkyl copolymers have found a broad application as additives in electrodeposition baths. These compounds are particularly used as grain refiners in alkaline zinc electrolytes.

The documents U.S. Pat. No. 5,405,523, U.S. Pat. No. 5,435,898 and WO 2004/044269 A2 describe the use of N,N'-Bis(dialkylaminoalkyl)urea-α,ω-dichloro-diethylether copolymers in alkaline zinc or zinc alloy electrolytes.

EP 1 114 206 B1 describes a formulation consisting of N,N'-Bis(dialkylaminoalkyl)urea-α,ω-dihalogenalkyl copolymers and quaternized pyridine-3-carboxylic acids and an aromatic aldehyde, which excels in that the often described formation of bubbles during zinc deposition can be avoided. Comparative experiments, however, show that a formation of bubbles occurs, in some cases after a longer period of time.

Documents WO 2007/747604 A2 and WO 2007/147605 A2 also describe the use of the above-referenced copolymers as additives in combination with quaternized nicotinamide and tripyridinium derivatives in zinc or zinc alloy baths.

Document WO 2007/025606 A1 describes the use of quaternized nitrogen polymers which may be obtained by reaction of a mixture consisting of N-(Dialkylaminoalkyl)-urea and a N,N'-Bis(dialkylaminoalkyl)-urea, or their guanidine or thiourea analogs, respectively, with a dihalogenalkane or epichlorohydrin. The aforementioned additives have found use in the bubble-free deposition of zinc layers from alkaline zinc electrolytes.

The above-mentioned copolymers may be produced according to U.S. Pat. No. 4,157,388 by a 1:1 reaction of a N,N'-bis(dialkylaminoalkyl)urea with a α,ω-dihaloalkane. By addition of a suitable alkylation agent, such as a monohaloalkane or an acid, the polymerization can be terminated and the molecular weight distribution can be set in accordance with the desired application.

Despite the aforementioned possibility of termination, the control of the reaction is extremely difficult with respect to the polymer composition and may lead to product mixtures only reproducible with difficulty. This may lead to, depending on the application, large fluctuations in the process and the product. Thus, it is known that particularly in electrodeposition processes, the molecular weight distribution of polymers does have a significant influence on the performance of the electrolytes with respect to the layer characteristics. Thus, using the above-referenced polymeric additives, as described e.g. in U.S. Pat. No. 5,405,523, U.S. Pat. No. 5,435,898 and WO 2004/044269 A2, zinc layers are often obtained, which tend toward formation of bubbles after a longer period of time. Moreover, the copolymers produced in this way often contain, in addition, an organically bound halogen, which gives, depending on the electrolyte, rise to an AOX contamination. Furthermore, using the production process described in U.S. Pat. No. 4,157,388, no mixed copolymers or oligomers containing different dihalo compounds or diamino compounds in alternating order can be produced.

The documents US 2008/0223726 A1 and EP 1 315 849 B1 describe the manufacture and use of mixed polymers as additives for zinc and zinc alloy electrolytes, which can be produced by a multi-component polymerization. In this case, besides the N,N'-Bis(dialkylaminoalkyl)urea derivatives (in particular urea, thiourea and guanidine derivatives), further amines or polyamines, respectively, or heterocyclic compounds, such as imidazole, are used. In this case, the ratio of the amine component to the halogen component is preferably 1:1. Using the manufacturing process described in both documents, there is often an arbitrary distribution of the reaction components and a formation of polymers having molecular weights which are detrimental to the quality of the deposited metal layer. Depending on the reaction conditions applied, such as reaction times, heating rates, geometries of the reactor, volume-surface-ratios, etc., one may arrive at product compositions reproducible only with difficulties and thus, at additive properties, which have a significant influence on the deposition results. The manufacture of so-called tailor-made polymers and thus, a targeted control of the layer to be deposited is thus complicated.

US 2008/0223729 A1 describes the beneficial influence of N,N'-Bis(dialkylaminoalkyl)guanidine derivatives on the level of brightness of the deposited zinc layers in alkaline zinc electrolytes. The disadvantage of these derivatives is that the higher gloss level is often bought at a worse distribution of the deposition, which represents a significant disadvantage, in particular in the case of drum electrodeposition.

Due to the manufacturing process, the above-mentioned (cationic) copolymers often contain halide ions as counter ions. Using N,N'-Bis(dialkylaminoalkyl)thiourea derivatives, thioronium compounds are often obtained at the polymerization, which have a negative influence on zinc depositions, since particularly these have a poor stability in alkaline mediums and will decompose.

Another disadvantage of the above-mentioned additives and the corresponding electrolytes is the occurrence of strong burnings or burnt deposits in the range of high current densities in case of zinc rich electrolytes (>10 g/L of zinc content).

DESCRIPTION OF THE INVENTION

Thus, it is an object of the invention to provide electrolyte baths for electrodeposition of a zinc or zinc alloy layer, during the use of which the aforementioned disadvantages do not occur.

The electrolyte baths according to the invention are, in particular, to mostly yield a bubble and burning-free zinc and zinc alloy layers having a mostly uniform distribution of layer thickness and high gloss.

This object is solved by the invention by means of an electrolyte bath for electrodeposition of a zinc or zinc alloy layer, wherein the electrolyte bath contains a polymer of the following formula I $$\text{A-[-L-A-]}_n\text{-L-A} \qquad (I)$$

wherein A represents a unit derived from a diamino compound of one of the following formulae II to VII

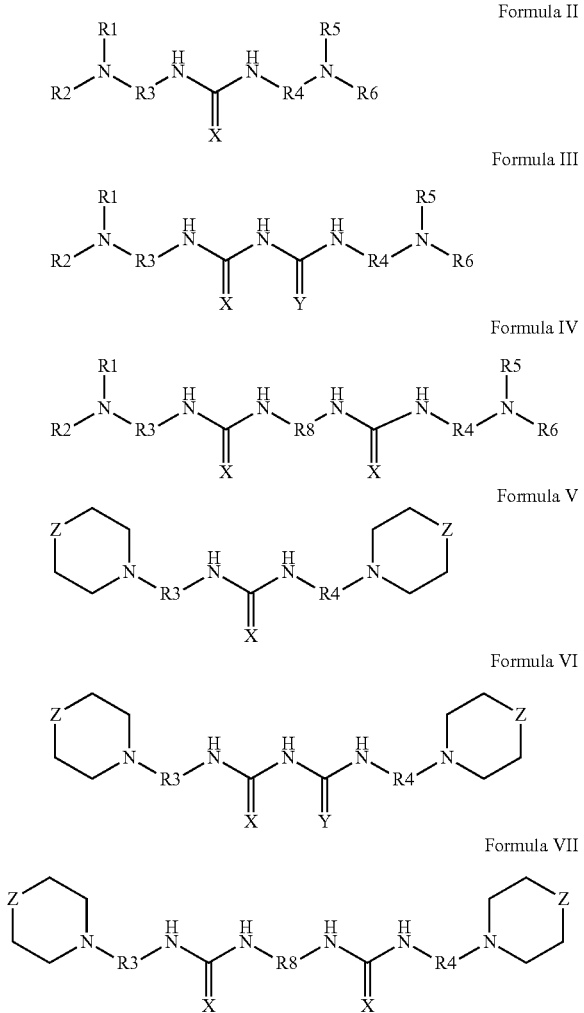

Formula II
Formula III
Formula IV
Formula V
Formula VI
Formula VII wherein
X and Y each can be the same or different and represent O or NR, wherein R stands for H or $C_1$-$C_6$-alkyl,
Z may be the same or different and represents O or S,
R1, R2, R5, and R6 may each be the same or different and represent a substituted or unsubstituted hydrocarbon residue with 1 to 10 carbon atoms, preferably methyl, ethyl, hydroxyethyl or —$CH_2CH_2(OCH_2CH_2)_y$—OH, wherein y is between 0 and 4, and
R3, R4, R8 may each be the same or different and represent $(CH_2)_p$, wherein p stands for an integer of 2 to 12, preferably for an ethylene or propylene group, or for a —[$CH_2CH_2O$]$_n$—$CH_2CH_2$— group, wherein n is between 1 and 40, preferably for a —$(CH_2)_2$—O—$(CH_2)_2$— or —$(CH_2)_2$—O—$(CH_2)_2$—O—$(CH_2)_2$— group,
wherein L stands for a divalent residue, which is selected from the group consisting of
—$(CH_2)_p$—, wherein p is between 1 and 12, preferably between 1 and 6, and most preferably between 2 and 4, —$CH_2$—$CH(OH)$—$CH_2$— and —[$CH_2CH_2O$]$_p$—$CH_2CH_2$—, wherein q is between 1 and 40, preferably —$(CH_2)_2$—O—$(CH_2)_2$— or —$(CH_2)_2$—O—$(CH_2)_2$—O—$(CH_2)_2$—;
wherein the single units A may be the same or different,
wherein the single units L may be the same or different,
wherein n represents an integer and n>0, preferably >3, more preferably >5, most preferably >10, and
wherein the polymer chain has units A at both ends.

R1, R2, R5 and R6 may represent, as mentioned before, a substituted or unsubstituted hydrocarbon residue having 1 to 10 carbon atoms, preferably methyl, ethyl, hydroxyethyl or —$CH_2CH_2(OCH_2CH_2)_y$—OH, wherein y is between 0 and 4. The aforementioned hydrocarbon residues can, in particular, be substituted with $C_1$-$C_6$ alkyl (preferably —$CH_3$, —$CH_2CH_3$), aryl (preferably phenyl) or aralkyl (preferably benzyl).

The term "polymer" has to be understood in a broad sense in connection with the present invention. It comprises any compound which has been formed by reaction of at least two monomer molecules. The term "polymer" does comprise, in particular, compounds which are typically designated as oligomers. The term "polymer" is, in connection with the present invention also applied to compounds, which are formed by a poly "condensation" reaction.

The polymer of Formula I can be obtained by reacting one or more diamino compounds of formulae II to VII with one or more compounds of the following formula VIII, $$P-L-Q \qquad (VIII)$$

wherein L has the same meaning as in formula I and wherein P and Q may each be the same or different and represent halogens such as Cl, Br and I or pseudohalogens such as OMs (mesylate), OTf (triflate), ONf (nonaflate), or OTs (tosylate), and
wherein the ratio ($n_A$:$n_B$) of the total amount of substance used of the compound(s) of formulae II to VII ($n_A$) to the total amount of substance of the compound(s) of formula VIII ($n_B$) is at least 1.1:1, preferably 1.3:1, more preferably at least 1.5:1.

The compounds of the Formula VIII are organic di(pseudo) halogen compounds.

This means that in the preparation of polymers of the Formula I, the di(pseudo)halogen compound of the Formula VIII is used in a substoichiometric amount with respect to component(s) of the Formula II to VII. Thus, it is effected that the chain of the polymer of the Formula I has units A having amino groups at both ends. These terminal amino groups are at first tertiary (as in the compounds of Formulae II to VII), but may be quaternized. In acidic solution, the amino groups exist in completely or partially protonated form.

The linkages between units A and residues L occur via quaternary ammonium groups, which are formed by substitution of groups P and Q in the compounds of Formulae VIII by the tertiary amino groups of the compounds of the Formulae II to VII.

These terminal tertiary amino groups may be quaternized in accordance with the desired properties by using a organic monohalide, such as benzyl chloride, allyl chloride, alkyl chloride or their corresponding bromides, or by using an appropriate mineral acid, such as hydrochloric acid, hydrobromic acid, hydroiodic acid or sulfuric acid.

The polymer of the Formula I preferably has a molecular weight of at least 500 (g/mol).

The reaction of diamino compounds of the Formulae II to VII with the compounds of the Formula VIII may preferably be carried out in aqueous or aqueous-alcoholic, respectively, solutions or solvent-free substances at temperatures of preferably 20 to 100° C.

The polymers of Formula I do not exhibit any organically bound halogen.

Preferably, to the polymers of the Formula I, if used as additives for electrolyte baths, halide ions are added. The addition of halide ions may in this case occur by addition of the corresponding mineral acids, in particular hydrochloric acid, or by quaternization of the terminal tertiary amino functionalities with the corresponding alkyl halides or by addition of alkaline, earth alkaline, zinc or ammonium halides. In this case, as ammonium halides, alkyl ammonium halides may be used besides the unsubstituted ammonium halide, such as tetraalkylammonium chloride or ammonium salts, as described in U.S. Pat. No. 3,960,677. Preferably, the polymer of the Formula I is acidified using hydrochloric acid. Preferably, approx. 2 equivalents of hydrochloric acid per equivalent of polymer are added.

Surprisingly, it has been found that the deposition results may be improved by addition of halide ions. In particular, the distribution of the electrolyte and the tendency towards burnings can be reduced. In addition, an increase of the current efficiency in the low current density area is achieved by addition of halide ions. Furthermore, by addition of halide ions, a variation of the brightness level is possible.

The polymers of Formula I can be produced selectively and reproducibly in accordance with the desired intended purpose. The possibility to build tailor-made block polymers is particularly advantageous. These may be consecutively built up by a targeted combination of various dimers, trimers or oligomers, respectively, by linkage with one or more dihalides. The polymers of the Formula I may be particularly built by consecutive linkage of different oligomer building blocks, such as dimers and/or trimers with one or more dihalides and pseudo halides of the Formula VIII in a segment-controlled manner.

Compounds of the Formulae II and V are described for the case of diamino ureas in JP 04-198160 and for the case of diamino guanidins in DE 30 03978 A1. The compounds of the Formulae III and VI may be obtained by reaction of the corresponding diamines with sodium dicyanamide. Reactions of this kind can be carried out in analogy to the reaction described, among others, in U.S. Pat. No. 4,183,958 A. Compounds of the Formulae IV and VII may be obtained by reactions of the corresponding dicarboxylic acid halides with the corresponding diamines. Compounds of the Formula VII are known per se and are often commercially available. Polymers of the Formula I, which contain units A derived from compounds of the Formula III are, in contrast, novel and can be provided by the present invention for the first time.

The polymers of the Formula I can be used in various zinc or zinc alloy baths, which are described in more detail in the following. The electrolyte bath according to the invention may thus be an acidic or alkaline zinc or zinc alloy bath. Preferably, the electrolyte bath according to the invention is cyanide-free.

In the bath according to the invention, the polymer of the Formula I is preferably contained in an amount of 0.01 to 50 g/L, preferably 0.25 to 10 g/L. The bath may contain a combination of various polymers of the Formula I.

Cyanide-free zinc electrolytes and their alloy baths may be divided into two types, namely weakly acidic zinc electrolytes (containing zinc chloride and/or zinc sulfate, respectively) and alkaline zinc electrolytes. A uniformly bright zinc layer is deposited from weakly acidic zinc bath, but these have the disadvantage that their current efficiency is always 100% over a broad current density range. In case of work pieces, which have a simple form, this may be judged as advantageous, since the current is used up for zinc deposition exclusively, however, in case of work pieces which have a complex geometry, this leads to a thick zinc layer in the area of high current density and to very thin zinc layers in the area of low current density.

The ratio of thickness of the zinc layer in the high current density range to the thickness of the zinc layer in the lower current density range is called layer thickness distribution (distribution coefficient) and is 1 in the ideal case. From the technical functional point of view, a zinc layer on the workpiece to be coated should have the same or approximately the same layer thickness at high brightness everywhere.

By decreasing the current efficiency in the high current density range, a favourable distribution of layer thickness may be achieved, whilst the current efficiency in the low current density range is maintained. This method of aligning the zinc layer thickness over a broad current density range has been accomplished hitherto in the case of zinc deposition from alkaline, cyanide-free electrolytes.

It has now been found that by using polymers of the Formula I having a suitable chain length, which may be adjusted readily, the layer properties of the deposited layers can be adjusted and bubble-free and burning-free zinc and zinc alloy layers can be obtained.

Alkaline Electrolyte Baths

The use of the compounds according to the invention having the Formula I is carried out in one embodiment in alkaline electrodeposition baths. Alkaline zinc electrodeposition baths are generally composed on the basis of an aqueous solution of zinc cations in the presence of alkali metal hydroxides. The documents DE 25 25 264 and U.S. Pat. No. 3,884,774 describe such electrolytes, however, the zinc layers obtained therewith do not show a uniform distribution of layer thickness. Such baths contain an inorganic alkaline component, preferably a hydroxide of an alkali metal, and especially preferably sodium hydroxide, potassium hydroxide and/or lithium hydroxide to adjust a pH value of at least 10, and preferably at least 11. In this case, amounts of 50 to about 250 g/L, and especially preferably 90 to 130 g/L of the alkaline component may be used.

The electrolyte baths according to the invention usually contain zinc cations in concentrations which range from about 0.1 to about 100 g/L, wherein concentrations of 4 to 30 g/L are preferred. The zinc ion may be present in the bath according to the invention in the form of a soluble salt, for example zinc oxide, zinc sulfate, zinc carbonate, zinc acetate, zinc sulfamate, zinc hydroxide, or zinc tartrate.

As the alloy metal, the bath according to the invention may contain about 0.1 to 50 g/L of metal ions. Suitable alloy metal salts are hydroxides, sulfates, carbonates, ammonium sulfates, sulfamates, acetates, formiates and halides, preferably chloride and bromide. As the suitable alloy metals, preferably cobalt, nickel, manganese and/or iron can be considered. The concentration of the alloy metal ions in the bath according to the invention may vary within a broad range and amounts to between 0.01 and 100 g/L. Since a different alloy content is required for different types of alloys in order to improve corrosion resistance, this concentration varies depending on the metal ions.

Preferably, the baths according to the invention may contain, as the alloy metal, from 0.1 to 50 g/L of nickel ions. Suitable nickel salts are nickel hydroxide, nickel sulfate, nickel carbonate, ammonium nickel sulfate, nickel sulfamate, nickel acetate, nickel formiate and nickel halides.

In a preferred embodiment, the electrolyte bath contains zinc in an amount of 0.1 to 30 g/L and cobalt in an amount of 10 to 120 mg/L, nickel in an amount of 0.3 to 3 g/L, manganese in an amount of 10 to 100 g/L and/or iron in an amount of 10 mg/L to 30 g/L.

As the brightening agent, besides polymers of Formula I, on the one hand, pyridinium derivatives of e.g. nicotinic acid or nicotinamide, as described in U.S. Pat. No. 6,652,728, may be used.

In case the baths according to the invention contain the aforementioned additional metal ions, it is appropriate to additionally add complexing agents to these baths which are compatible with these additional metal ions, in order to control the deposition potentials and in order to allow a co-reduction with the present zinc ions. As such a complexing agent, chelating agents are preferred. Examples for suitable complexing agents are hydroxy carboxylates, such as sodium gluconate, amino alcohols such as triethanolamine, polyamines such as polyethylene diamine, aminocarboxylates such as EDTA or Trilon M, aminophosphonates such as amino-tris(methylenephosphonic acid), and polyvalent alcohols such as sorbitol or sucrose. The complexing agents may be contained individually or in a mixture in the baths according to the invention with the amounts being preferably in the range of 2 to 200 g/L.

Furthermore, the baths according to the invention may contain levelling agents such as 3-mercapto-1,2,4-triazole and/or thiourea. The concentration of the levelling agent corresponds to the usual concentration of zinc baths and amounts to e.g. 0.01 to 0.50 g/L. Further additives for the baths according to the invention are aromatic aldehydes or their bisulfite adducts.

Preferred aromatic aldehydes are 4-hydroxybenzaldehyde, 4-hydroxy-3-methoxy-benzaldehyde, 3,4-dimethoxybenzaldehyde, 3,4-methylendioxybenzaldehyde, 2-hydroxybenzaldehyde and mixtures thereof. These additives, which concentration is in the range of 0.005 to 1.0 g/L, preferably 0.01 to 0.50 g/L, act as brightening agents in a manner known per se.

Furthermore, the baths according to the invention may contain, as a brightening agent, other substances as well, selected from the group of sulfur compounds, aldehydes, ketones, amines, polyvinyl alcohol, polyvinyl pyrrolidone, proteins or reaction products of halohydrines with aliphatic amines, polyamines or heterocyclic nitrogen compounds or mixtures thereof.

Moreover, the baths according to the invention may contain, in addition, water softening agents, which reduce the sensitivity of the electrolyte according to the invention towards foreign metal ions, in particular calcium and magnesium from tap water, using such additives. Examples for such water softening agents are EDTA, sodium silicate and tartaric acid.

The baths according to the invention effect the deposition of a blank, planar and ductile zinc or zinc alloy layer at any common temperature ranging from about 15° C. to 50° C., preferably 20° C. to 30° C., especially preferably about 25° C. At this temperatures, the baths according to the invention are stable and effective over a wide current density range of 0.01 to 10 A/dm$^2$, particularly preferably 0.5 to 4 A/dm$^2$.

As shown by Examples 12 and 13 (Table 3), the polymers of Formula I surprisingly show particularly advantageous effects in case of alkaline zinc nickel deposition.

Acidic Electrolyte Baths

The use of the compounds according to the invention in accordance with Formula I occurs, according to a further embodiment, in acidic electrodeposition baths.

Common acidic zinc baths show, depending on the kind of method, often burnings. By using the polymers of Formula I, this disadvantage can be overcome. This is shown by Examples 14 to 22 (Table 4).

The acidic bath according to the invention contains zinc ions in a concentration of about 0.2 to 80 g/L, preferably 10 to 50 g/L.

The acidic zinc and zinc alloy electrolytes according to the invention may contain one or more salts for increasing the conductivity, such as sodium chloride, sodium sulfate, sodium fluoride, potassium chloride, potassium fluoride, potassium sulfate, ammonium chloride, ammonium fluoride and/or ammonium sulfate in an amount of 50 to 300 g/L or more.

In some cases, the tin-zinc electrolytes according to the invention may also contain one or more brightening agents known in the art. According to one embodiment, the baths contain at least one further brightening agent, selected from aromatic carbonyl compounds. The aromatic carbonyl compounds act as a brightening agent, which impart an optimum levelling and brightening effect over a wide range of current density. The aromatic carbonyl compounds may be aromatic aldehydes, acetophenones and carbonyl compounds.

Examples for aromatic aldehydes include benzaldehyde, o-chlorobenzaldehyde, m-chlorobenzaldehyde, p-chlorobenzaldehyde, o-hydroxybenzaldehyde, m-hydroxybenzaldehyde, p-hydroxybenzaldehyde, o-aminobenzaldehyde, veratraldehyde, 2,4-dichlorobenzaldehyde, 3,4-dichlorobenzaldehyde, 3,5-dichlorobenzaldehyde, 2,6-dichlorobenzaldehyde, tolualdehyde, 3,4-dimethoxybenzaldehyde, cinnamaldehyde, anisaldehyde, 1-naphthaldehyde, 2-naphthaldehyde, 2-methoxy-1-naphthaldehyde, 2-hydroxy-1-naphthaldehyde, 2-ethoxy-1-naphthaldehyde, 4-methoxy-1-naphthaldehyde, 4-ethoxy-1-naphthaldehyde and 4-hydroxy-1-naphthaldehyde. In the case of some compounds, a combination of the naphthaldehyde with a benzaldehyde, for example 1-naphthaldehyde and 2,6-dichlorobenzaldehyde, a superior deposition on the substrates is provided. Examples for other carbonyl compounds include aromatic aldehydes and ketones such as benzylidene acetone, coumarin, acetophenone, propiophenone, and 3-methoxybenzacetophenone. Further carbonyl compounds include furfurylidene acetone, 3-indole carboxaldehyde and thiophene carboxaldehyde. The amount of the aromatic aldehyde for the carbonyl containing compounds in the baths according to the invention is in the range of up to about 2 g/L of bath and preferably from about 0.005 to about 2 g/L of bath. The brightening agents are generally added to the electroplating baths as the bisulfite addition products.

Furthermore, mixtures of aliphatic aldehydes and the above-described aromatic aldehydes and mixtures of naphthaldehydes and benzaldehydes are also suitable. Examples for suitable combination include the following: a mixture of acid aldehyde and 4-methoxy-1-naphthaldehyde, a mixture of formaldehyde, 1-naphthaldehyde and 2,6-dichlorobenzaldehyde etc.

Further suitable carboxyl containing brightening agent compounds include the aromatic carboxylic acids and salts thereof, such as benzoic acid, sodium benzoate, sodium salicylate and nicotinic acid.

The pH value of the acidic zinc and zinc alloy baths of the invention amounts to between 2 to 7, preferably 4 to 6.

The baths according to the invention effect deposition of a blank, planar and ductile zinc or zinc alloy layer at each common temperature of about 15° C. to 60° C., preferably 20° C. to 45° C., particularly preferably about 25° C. to 40° C. At these temperatures, the baths according to the invention are stable and effective over a wide current density range of 0.01 to 20 A/dm$^2$, preferably 0.1 to 15 A/dm$^2$, and particularly preferably 0.1 to 10 A/dm$^2$.

As the suitable alloy metals, preferably cobalt, nickel, manganese, tin and/or iron are to be considered. The concentration of the alloy metal ions in the baths according to the invention may vary within wide range and amounts preferably to 0.01 to 300 g/L. As a different content of alloy is required for different alloy types, for example in order to improve the corrosion resistance, the concentration varies, depending on the metal ion.

Preferably, the acidic zinc nickel baths according to the invention contain, as the alloy metal, about 0.1 to 110 g/L, preferably 1 to 35 g/L of nickel ions. Suitable nickel salts are nickel sulfate, nickel carbonate, ammonium nickel sulfate, nickel sulfamate, nickel acetate, nickel formiate and nickel halides.

Preferably, the acidic zinc cobalt bath according to the invention contain, as the alloy metal, about 0.01 to 10 g/L of cobalt ions. In the case of acidic zinc iron electrolytes, the electrolytes according to the invention contain 10 to 60 g/L of iron ions. Suitable iron salts are iron sulfate, iron methane sulfonate, ammonium iron sulfate, iron sulfamate, iron acetate, iron formiate and iron halides.

In a preferred embodiment, the electrolyte bath contains zinc in an amount of 0.1 to 30 g/L and cobalt in an amount of 10 mg to 120 mg/L, nickel in an amount of 0.3 to 3 g/L, manganese in an amount of 10 to 100 g/L and/or iron in an amount of 10 mg/L to 30 g/L.

Moreover, the polymers of the Formula I according to the invention may be used in acidic tin-zinc alloy baths. Generally, the tin-zinc alloy baths according to the invention contain between 0.1 to 10 g/L, particularly preferably 0.2 to 6 g/L of the polymer of Formula I.

The tin-zinc electrolyte baths according to the present invention preferably contain tin(II) ions in concentrations of about 1 g/L to about 100 g/L and the zinc ions in a concentration of about 0.2 to 80 g/L.

In accordance with a further embodiment, the electrolyte baths contain about 5 g/L to 40 g/L of tin(II) ions and about 5 to about 50 g/L of zinc ions. By means of the entire written description of the invention, the range and the ratio limits may be combined and varied.

The tin(II) ion may be present in form of a soluble salt, such as tin(II) sulfate, tin(II) methane sulfonate, tin(II) chloride, tin(II) fluoride, tin(II) sulfamate, tin(II) acetate, tin(II) oxide, etc. The zinc ion may exist in the bath in form of zinc sulfate, zinc methane sulfonate, zinc sulfamate, zinc chloride, zinc fluoride, zinc acetate, zinc tetrafluoro borate, etc. In accordance with an embodiment, tin(II) ions as well as zinc ions are present in form of the chloride salts.

The composition of the tin-zinc alloy deposition includes 0 to 100 wt.-% of tin, preferably 20 to 60 wt.-% of tin, and particularly preferably 30 to 50 wt.-% of tin.

The tin-zinc alloy electrolyte may contain monomer salts for increasing the conductivity, such as sodium chloride, sodium sulfate, sodium fluoride, potassium chloride, potassium fluoride, potassium sulfate, ammonium chloride, ammonium fluoride and/or ammonium sulfate in an amount of 50 to 300 g/L or more.

According to one embodiment, the salt for increasing the conductivity are chlorides, and the tin(II) and zinc salts are tin(II) chloride and zinc chloride.

In case the baths according to the invention contain the aforementioned additional metal ions, it is appropriate to additionally add complexing agents to these baths which are compatible with these additional metal ions, in order to control the deposition potentials and in order to allow a co-reduction with the present zinc ions. As such a complexing agent, chelating agents are preferred. Examples for suitable complexing agents are hydroxy carboxylates, such as sodium gluconate, amino alcohols such as triethanolamine, polyamines such as polyethylene diamine, aminocarboxylates such as EDTA or Trilon M, aminophosphonates such as amino-tris(methylenephosphonic acid), and polyvalent alcohols such as sorbitol or sucrose. The complexing agents may be contained individually or in a mixture in the baths according to the invention with the amounts being preferably in the range of 2 to 200 g/L.

Use of the Electrolyte Bath According to the Invention

The electrolyte baths according to the invention may be used for bulk parts, for example in drum electrodeposition methods and for deposition on larger workpieces in rack plating methods. In this case, anodes are used which may be soluble, such as zinc anodes, which serve, at the same time, as a source for zinc ions in order to substitute the zinc deposited on the cathode by dissolution of zinc at the anode. With respect to alloy depositions, alloy anodes or anodes of the alloy metal, respectively, and/or two anodes, composed of tin and the alloy metal, may be used.

On the other hand, unsoluble anodes (e.g. platinised titanium mixed oxides) may be used, in which case the withdrawn zinc ion and/or further metal ions have to be re-added in case of alloy depositions, e.g. by using a zinc dissolving tank.

The deposition method may be operated with injection of air, with movement of the articles or without movement without any disadvantages resulting for the obtained coatings. For avoiding or reduction, respectively, of oxidations of the included additives, it may be worked using separation of electrode spaces, or by using membrane anodes, respectively.

As a power supply, common DC converters or pulse converters are used.

The invention comprises in particular the following embodiments:

(1) A electrolyte bath for electrodeposition of a zinc or zinc alloy layer according to claim 1.

(2) The electrolyte bath according to paragraph (1), wherein the electrolyte bath is an alkaline bath.

(3) The electrolyte bath according to paragraph (2), wherein the electrolyte bath contains one or more polymers of the Formula I in a concentration of 0.01 to 50 g/L, preferably 0.25 to 10 g/L.

(4) The electrolyte bath according to paragraph (1), wherein the zinc source is zinc oxide.

(5) The electrolyte bath according to one of paragraphs (1) to (4), wherein the concentration of the zinc ions is 0.1 to 100 g/L, particularly preferably 4 to 30 g/L.

(6) The electrolyte bath according to one of paragraphs (2) and (3), wherein the electrolyte bath contains quaternized pyridinium compounds as brightening agents, which may be prepared alkylation or reaction, respectively, with propane and butane sultone with nicotinic acid or nicotinamide derivatives, in a concentration of 0.005 to 0.5 g/L, particularly preferably 0.01 to 0.3 g/L.

(7) The electrolyte bath according to one of paragraphs (1) to (6), wherein the electrolyte bath contains aromatic aldehydes or bisulfite adducts thereof in a concentration of 0.005 to 1 g/L, preferably 0.01 to 0.50 g/L.

(8) The electrolyte bath according to one of paragraphs (1) to (7), wherein the electrolyte bath is an alkaline electrolyte bath and contains the further metal ions of cobalt, nickel, iron and/or manganese.

(9) The electrolyte bath according to paragraph (8), wherein the zinc is present in a concentration of 0.1 to 30 g/L, cobalt is present in a concentration of 10 to 120 mg/L, nickel is present in a concentration of 0.3 to 3 g/L, manganese is present in a concentration of 10 to 100 g/L, and iron is present in the concentration of 10 mg/L to 30 g/L.

(10) The electrolyte bath according to one of paragraphs (2), (3), (6), (8) or (9), wherein the electrolyte bath contains an alkali metal hydroxide, preferably sodium hydroxide, lithium hydroxide and/or potassium hydroxide.

(11) The electrolyte bath according to paragraph (10), wherein the alkali metal hydroxide is present in a concentration of 80 to 250 g/L.

(12) The electrolyte bath according to one of paragraphs (1) to (11), wherein the electrolyte bath contains a complexing agent or a water softening agent.

(13) The electrolyte bath according to paragraph (12), wherein the electrolyte bath contains a chelating agent as a complexing agent.

(14) The electrolyte bath according to paragraph (13), wherein the chelating agent is selected from the group of hydroxycarboxylates, amino alcohols, polyamines, aminocarboxylates, aminophosphonates and polyvalent alcohols, or mixtures thereof.

(15) The electrolyte bath according to one of paragraphs (13) or (14), wherein the chelating agent is present in a concentration of 2 to 200 g/L.

(16) The electrolyte bath according to paragraph (1), wherein the electrolyte bath is a weakly acidic ammonium containing electrolyte bath.

(17) The electrolyte bath according to paragraph (16), wherein the electrolyte bath contains the polymer of the Formula I in a concentration of 0.001 to 10 g/L, preferably 0.2 to 8 g/L.

(18) The electrolyte bath according to one of paragraphs (16) or (17), wherein the electrolyte bath contains the further metal ions of cobalt, nickel, iron, tin, copper and/or manganese or mixtures thereof.

(19) The electrolyte bath according to paragraph (18), wherein zinc is present in a concentration of 0.1 to 30 g/L, cobalt in a concentration of 10 to 120 mg/L, nickel in a concentration of 0.3 to 3 g/L, manganese in a concentration of 10 to 100 g/L, tin in a concentration of 1 g/L to 100 g/L and iron is present in a concentration of 100 mg/L to 30 g/L.

(20) The electrolyte bath according to one of paragraphs (16) to (19), wherein the pH value of the bath is between 2 and 7, preferably between 4 and 6.

(21) The electrolyte bath according to one of paragraphs (16) to (20), wherein the electrolyte bath contains aromatic carbonyl and/or α,β-unsaturated carbonyl compounds in a concentration of 0.001 to 2 g/L, preferably 0.1 to 2 g/L.

(22) The electrolyte bath according to paragraph (21), wherein the electrolyte bath contains, as the carbonyl compounds, benzaldehyde, o-chlorobenzaldehyde, m-chlorobenzaldehyde, p-chlorobenzaldehyde, o-hydroxybenzaldehyde, m-hydroxybenzaldehyde, p-hydroxybenzaldehyde, o-aminobenzaldehyde, verataldehyd, 2,4-dichlorobenzaldehyde, 3,4-dichlorobenzaldehyde, 3,5-dichlorobenzaldehyde, 2,6-dichlorobenzaldehyde, tolualdehyde, 3,4-dimethoxybenzaldehyde, cinnamaldehyde, anisaldehyde, 1-naphthaldehyde, 2-naphthaldehyde, 2-methoxy-1-naphthaldehyde, 2-hydroxy-1-naphthaldehyde, 2-ethoxy-1-naphthaldehyde, 4-methoxy-1-naphthaldehyde, 4-ethoxy-1-naphthaldehyde, 4-hydroxy-1-naphthaldehyde, dibenzylidene acetone, benzalactone, coumarin, acetophenone, propiophenone, 3-methoxybenzacetophenone, furfurylideneactone, 3-indolcarboxyaldehyde, thiophencarboxyaldehyde, cinnamic acid, benzoic acid, nicotinic acid, salicylic acid or nicotin dicarboxylic acid or mixtures thereof.

(23) The electrolyte bath according to one of paragraphs (16) to (22), wherein the electrolyte bath contains a complexing agent.

(24). The electrolyte bath according to paragraph (23), wherein the complexing agent is selected from the group consisting of hydroxy carboxylates, amino alcohols, polyamines, amino carboxylates, amino phosphonates and polyhydric alcohols, as well as mixtures thereof.

(25) The electrolyte bath according to one of paragraphs (16) to (24), wherein the electrolyte bath contains one or more salts for increasing the conductivity, such as sodium chloride, sodium sulfate, sodium fluoride, potassium chloride, potassium fluoride, potassium sulfate, ammonium chloride, ammonium fluoride and/or ammonium sulfate.

(26) The electrolyte bath according to paragraph (25), wherein the electrolyte bath contains salts for increasing conductivity in a concentration of 50 to 300 g/L.

(27) A process for electrodeposition of bright and planar zinc or zinc alloy coatings, comprising the steps of immersing a substrate to be coated into an electrolyte bath according to one of paragraphs (1) to (26).

(28) The process according to paragraph (27), wherein the bath is operated at a current density of 0.01 to 20 A/dm$^2$, preferably 0.1 to 15 A/dm$^2$, particularly preferably 0.01 to 10 A/dm$^2$.

(29) The process according to one of paragraphs (27) or (28), wherein the bath is operated at a temperature of 15 to 50° C., preferably 20° C. to 45° C., and particularly preferably 25° C. to 40° C.

(30) The process according to one of paragraphs (27) to (29), wherein the coatings are deposited on a conductive substrate using a barrel plating method.

(31) The process according to one of paragraphs (27) to (29), wherein the coatings are deposited on a conductive substrate using a rack plating method.

(32) The process according to one of paragraphs (27) to (31), wherein a zinc coating is deposited on the substrate.

(33) The process according to one of paragraphs (27) to (31), wherein a zinc alloy coating is deposited on the substrate.

(34) The process according to paragraph (33), wherein a coating of a zinc alloy is coated on the substrate with one or more metals from the group consisting of cobalt, nickel, manganese, tin, copper and/or iron.

EXAMPLES

The following examples illustrate the invention; however, the invention is not limited to these examples.

Preparation Example 1

N,N'-bis[2-(dimethylamino)ethyl]urea 676.43 mL (5.883 mol) of N,N'-dimethylaminoethyl amine and 174.50 g (2.905 mol) of urea were suspended and slowly heated to reflux under elusion of ammonium. The boiling temperature was, at the beginning, at 106° C. and was increased within 6 hours to 160° C. After termination of gas formation, the reaction mixture was cooled to room temperature and the crude product was distilled in high vacuo (150° C. at 0.02 mbar).

557.16 g of a colourless solid were obtained (94.81% of theory).

Preparation Example 2

N,N'-bis[3-(dimethylamino)propyl]urea

In a double shell reactor, 3.527 kg (58.72 mol) urea were suspended in 14.963 L (118.91 mol) of N,N-dimethylaminopropylamine. Afterwards, the reaction mixture was heated to 110 to 115° C. within an hour, at which point the reaction started. The ammonia formed was flushed out using a weak injection of nitrogen. The reaction temperature was increased constantly over a period of 6 hours up to an end temperature of 160° C. and was kept for five hours until termination of reflux. Afterwards, the reaction mixture was cooled to 80° C. and a vacuo was slowly applied until an end pressure of 38 mbar was reached.

13.406 kg of a clear viscous liquid were obtained. (99.10% of theory).

Preparation Example 3

N,N'-bis[3-(dimethylamino)propyl]guanidine

In a 2 L three-neck stirring apparatus, 250 g (2.617 mol) of guanidine hydrochloride were heated under nitrogen atmosphere to 190° C. under formation of a glass clear melted mass. Afterwards, 200 mL (1.57346 mol) N,N'-dimethylaminopropylamine were added dropwise in 90 minutes at 185° C. After the addition was complete, it was cooled to room temperature. Afterwards, the reaction mixture was heated to 185° C. once more, and a further 600 mL (4.720 mol) of N,N'-dimethylaminopropylamine were continuously added within 8 hours. After addition was complete, the reaction temperature dropped to 160° C. and the reaction mixture was boiling vigorously. A further 274.45 mL (2.159 mol) of N,N-dimethylaminopropylamine were rapidly added dropwise and the reaction mixture was stirred for a further 30 minutes at 150° C. Afterwards, the reaction mixture was cooled to room temperature and sodium hydroxide solution (30 wt.-%) (438 g (10.96 mol) of sodium hydroxide, dissolved in 1022 g of water) and it was stirred for 30 minutes. The upper organic layer was separated and the lower layer was discarded. The volatile constituents, which were remaining in the organic layer, were removed at 150° C. and 12 mbar and the residue was filtrated at 150° C. After cooling down to room temperature, 354.45 g of a yellow-orange oil were formed (59.05% of theory).

Preparation Example 4

N,N'-bis[2-(dimethylamino)ethyl]biguanidine 17.9 g (0.144 mol) of N,N.dimethylamino ethylamine hydrochloride were suspended in 30 mL of butanol, and 12.8 g (0.144 mol) of sodium dicyanamide was added, and the reaction mixture was heated to reflux for 20 hours. Afterwards, the reaction mixture was diluted with ethyl acetate and the precipitated solid was filtered. The excessive solvent was removed in vacuo. The resulting solid was taken up once more in 100 ml butanol and 11.92 g (135.25 mmol) of N,N'-dimethylamino ethylamine and 32.29 g (326.96 mmol) of concentrated hydrochloric acid (37 wt.-%) were added and the reaction heated once more for 30 hours under reflux. After completion of the reaction, 60 mL of methanol were added and the reaction mixture was stirred a further 20 hours at room temperature. Afterwards, the reaction mixture was neutralized using 43.58 g (326.95 mmol) of a 30% sodium hydroxide solution. The excessive solvent was removed in vacuo, the residue was taken up in dimethyl formamide and the precipitated sodium chloride was separated off. Afterwards, dimethyl formamide was distilled off in vacuo and dried at 100° C. in vacuo.

30.03 g of a white solid were formed (91.2% of theory).

Preparation Example 5

N,N'-bis[3-(dimethylamino)propyl]-succinamide 49.285 g (0.3021 mol) of succinic acid dichloride were dissolved in 50 mL of diethyl ether and an etherical solution consisting of 76.80 mL (0.6042 mol) of N,N'-dimethylaminopropyl amine and 84.60 mL (0.6042 mol) of triethylamine in 450 mL of diethyl ether was added over 2 hours at max. 10° C. under ice cooling. After completion of the addition, the reaction mixture was stirred at room temperature for an hour. Subsequently, 200 mL of dichloromethane were added and the reaction mixture was heated under reflux for one hour. Subsequently, the reaction was cooled to room temperature and the excessive solvent was removed in vacuo. To the solid residue, 32.02 g (0.3021 mol) of sodium carbonate and 500 mL of water were added, and it was stirred for 30 minutes and the water was removed. The solid residue was once more taken up in 200 mL and the reaction mixture was filtered. To the filtrate, 10 g of activated carbon were added, it was stirred for 30 minutes, filtered and the excessive ethanol was removed in vacuo. The residue thus formed was boiled out with ethyl acetate twice, the insoluble precipitate being discarded. To the combined ethyl acetate fractions, 10 g of active carbon were added, and it was heated to 10 minutes under reflux and subsequently hot filtered. The excessive ethyl acetate was distilled off and the residue was stirred in 300 mL of diethyl ether for 10 minutes. Subsequently, the solid was filtered off and dried in vacuo.

39.08 g of a light brown solid were obtained (45.16% of theory).

Preparation Example 6

Polymer having a monomer A of Formula II, wherein R1, R2, R5, R6=methyl, R3, R4=$(CH_2)_2$ and X=O, and a monomer B, wherein X, Y=Cl, R9=$(CH_2)_2$—O—$(CH_2)_2$—O—$(CH_2)_2$; molar ratio A B=4:3

20.0 g (0.099 mol) of N,N'-bis[2-(dimethylamino)ethyl] urea were dissolved in 34.33 g of water. Subsequently, 12.01 mL (0.0743 mol) of 1,2-bis(2-chloroethoxy)ethane were added and the reaction mixture was heated to 80° C. for 4 hours. After cooling, an aqueous polymer solution was obtained.

Preparation Example 7

Polymer according to Preparation Example 6, acidified to pH 2

34.33 g (50 wt-%) of an aqueous polymer solution according to Preparation Example 6 were adjusted to a pH value of 2 using 2.35 mL of hydrochloric acid (37 wt.-%).

Preparation Example 8

Polymer with a monomer A of Formula II, wherein R1, R2, R5, R6=methyl, R3, R4=$(CH_2)_2$ and X=O, and a monomer B, wherein X, Y=Cl, R9=$(CH_2)_2$—O—$(CH_2)_2$; molar ratio A:B=4:3

20.0 g (0.099 mol) of N,N'-bis[2-(dimethylamino)ethyl]urea were dissolved in 30.62 g of water. Subsequently, 8.71 mL (0.0743 mol) of bis-(2-chloroethyl)ether were added and the reaction mixture was heated to 80° C. for 4 hours. After cooling, an aqueous polymer solution was obtained.

Preparation Example 9

Polymer according to Preparation Example 8, acidified to pH 2

30.62 g (50 wt-%) of an aqueous polymer solution according to Preparation Example 8 were adjusted to a pH value of 2, using 2.52 mL hydrochloric acid (37 wt.-%).

Preparation Example 10

Polymer with a monomer A of Formula II, wherein R1, R2, R5, R6=methyl, R3, R4=$(CH_2)_3$ and X=O, and a monomer B, wherein X=Cl, Y=Br, R9=$(CH_2)_3$; molar ratio A:B=4:3

50.0 g (0.2171 mol) of N,N'-bis[3-(dimethylamino)propyl]urea were dissolved in 75.86 g of water. Subsequently, 16.26 mL (0.1628 mol) of 1-bromo-3-chloro-propane were added and the reaction mixture was heated to 80° C. for 4 hours. After cooling, an aqueous polymer solution was obtained. The polymer thus obtained was adjusted to a pH value of 2.5 using 2.74 mL of hydrochloric acid (37 wt.-%).

Preparation Example 11

Polymer with a monomer A of Formula II, wherein R1, R2, R5, R6=methyl, R3, R4=$(CH_2)_3$ and X=O, and a monomer B, wherein X=Cl, Y=Br, R9=$(CH_2)_3$; molar ratio A:B=5:4

50.0 g (0.2171 mol) of N,N'-bis[3-(dimethylamino)propyl]urea were dissolved in 77.90 g of water. Subsequently, 17.44 mL (0.1737 mol) of 1-bromo-3-chloro-propane were added and the reaction mixture was heated to 80° C. for 4 hours. After cooling, an aqueous polymer solution was obtained. The polymer thus obtained was adjusted to a pH value of 2.5 using 1.94 mL of hydrochloric acid (37 wt.-%).

Preparation Example 12

Polymer with a monomer A of Formula II, wherein R1, R2, R5, R6=methyl, R3, R4=$(CH_2)_3$ and X=O, and a monomer B, wherein X, Y=Cl, R9=$(CH_2)_2$—O—$(CH_2)_2$; molar ratio A:B=4:3

289.74 g (1.2578 mol) of N,N'-bis[3-(dimethylamino)propyl]urea were dissolved in 423.29 g of water. Subsequently, 111.69 mL (0.9433 mol) of bis-(2-chloroethyl)ether were added and the reaction mixture was heated to 80° C. for 3 hours. After cooling, an aqueous polymer solution was obtained.

Preparation Example 13

Polymer according to Preparation Example 12, acidified to pH 2

30.62 g (50 wt.-%) of an aqueous polymer solution according to Preparation Example 12 were adjusted to a pH value of 2, using 2.52 mL hydrochloric acid (37 wt.-%).

Preparation Example 14

Polymer with a monomer A of Formula II, wherein R1, R2, R5, R6=methyl, R3, R4=$(CH_2)_3$ and X=O, and a monomer B, wherein X. Y=Cl, R9=$(CH_2)_2$—O—$(CH_2)_2$; molar ratio A:B=5:4

15.95 g (0.0693 mol) of N,N'-bis[3-(dimethylamino)propyl]urea were dissolved in 23.79 g of water. Subsequently, 6.49 mL (0.0554 mol) of bis-(2-chloroethyl)ether were added and the reaction mixture was heated to 80° C. for 4 hours. After cooling, an aqueous polymer solution was obtained.

Preparation Example 15

Polymer with a monomer A of Formula II, wherein R1, R2, R5, R6=methyl, R3, R4=$(CH_2)_3$ and X=O, and a monomer B, wherein X, Y=Cl, R9=$(CH_2)_2$—O—$(CH_2)_2$; molar ratio A:B=10:9

14.18 g (0.0616 mol) of N,N'-bis-[3-(dimethylamino)propyl]urea were dissolved in 22.02 g of water. Subsequently, 6.56 mL (0.0554 mol) of bis-(2-chloroethyl)ether were added and the reaction mixture was heated to 80° C. for 4 hours. After cooling, an aqueous polymer solution was obtained.

Preparation Example 16

Polymer with a monomer A of Formula II, wherein R1, R2, R5, R6=methyl, R3, R4=$(CH_2)_3$ and X=NH, a monomer B1, wherein X, Y=Cl, R9=$(CH_2)_2$—O—$(CH_2)_2$, and a monomer B2, wherein X, Y=Cl, R9=$CH_2CHOHCH_2$; molar ratio A:B1:B2=4:2:1

50 g (0.218 mol) of N,N'-bis[3-(dimethylamino)propyl]urea were dissolved in 65.59 g of water. Subsequently, 12.79 mL (0.109 mol) of bis-(2-chloroethyl)ether were added and the reaction mixture was heated to 80° C. for 4 hours. After the reaction was completed, the reaction mixture was cooled to room temperature and adjusted to a 50% aqueous oligomer solution using 2.8 g of water. To this oligomer solution, 5.25 mL (0.0545 mol) of 1,3-dichloro-2-propanol were added, and the reaction mixture was once more heated to 80° C. for 4 hours. An aqueous polymer solution was formed.

Preparation Example 17

Polymer according to Preparation Example 16, acidified to pH 2

13.629 g (50 wt.-%) of an aqueous polymer solution according to Preparation Example 16 were adjusted to a pH value of 2, using 2.5 mL hydrochloric acid (37 wt.-%).

Preparation Example 18

Polymer with a monomer A of Formula IV, wherein R1, R2, R5, R6=methyl, R3, R4=$(CH_2)_3$, R8=$(CH_2)_2$ and X, Y=O, and a monomer B, wherein X, Y=Cl, R9=$(CH_2)_2$—O—$(CH_2)_2$; molar ratio A:B=4:3

5 g (17.5 mmol) of N,N'-bis[3-(dimethylamino)propyl]-succinamide were dissolved in 7 g of water and 1.87 g (13.1 mmol) of bis-(2-chloroethyl)-ether were added. Subsequently, the reaction mixture was heated to reflux for 12 hours. An aqueous polymer solution is formed.

Preparation Example 19

Polymer with a monomer A of Formula III, wherein R1, R2, R5, R6=methyl; R3, R4=$(CH_2)_2$ and X, Y=NH, and a monomer B, wherein X, Y=Cl, R9=$(CH_2)_2$—O—$(CH_2)_2$; molar ratio A:B=4:3

0.9 g (3.68 mmol) of N,N'-bis[2-(dimethylamino)ethyl]biguanidine were dissolved in 10 mL of water and 0.39 g (2.76 mmol) of bis-(2-chloroethyl)ether were added. Subsequently, the reaction mixture was heated to reflux for 24 hours. An aqueous polymer solution was formed.

Preparation Example 20

Oligomer with a monomer A of Formula II, wherein R1, R2, R5, R6=methyl, R3, R4=$(CH_2)_3$ and X=O, and a monomer B, wherein X, Y=Cl; R9=$(CH_2)_2$—O—$(CH_2)_2$; molar ratio A:B=2:1

100 g (0.434 mol) of N,N'-bis[3-(dimethylamino)propyl] urea were dissolved in 131.35 g of water. Afterwards, 25.72 mL (0.217 mol) of bis-(2-chloroethyl)ether were added and the reaction mixture was heated to 80° C. for 4 hours. After the reaction was completed, the reaction mixture was cooled to room temperature. An aqueous oligomer solution was obtained.

Preparation Example 21

Oligomer according to Preparation Example 20, acidified to pH 2

To 50 g of an oligomer solution (50 wt.-%), prepared according to Preparation Example 20, concentrated hydrochloric acid was added until a pH value of 2 was reached.

Preparation Example 22

Polymer with a monomer A of Formula II, wherein R1, R2, R5, R6=methyl, R3, R4=$(CH_2)_3$ and X=O, and a monomer B, wherein X=Cl, Y=Br, R9=$(CH_2)_3$; molar ratio A:B=2:1

50.0 g (0.2171 mol) of N,N'-bis[3-(dimethylamino)propyl] urea were dissolved in 66.91 g of water. Subsequently, 17.26 mL (0.1086 mol) of 1-bromo-3-chloro-propane were added and the reaction mixture was heated to 80° C. for 16 hours. After cooling, an aqueous polymer solution was obtained.

Preparation Example 23

Polymer with a monomer A of Formula II, wherein R1, R2, R5, R6=methyl, R3, R4=$(CH_2)_3$ and X=O, and a monomer B, wherein X, Y=Cl; R9=$(CH_2)_2$—O—$(CH_2)_2$—O—$(CH_2)_2$; molar ratio A:B=4:3

10.0 g (0.0436 mol) of N,N'-bis[3-(dimethylamino)propyl] urea were dissolved in 16.31 g of water. Subsequently, 5.29 mL (0.0327 mol) of 1,2-bis-(2-chloroethoxy)ethane were added and the reaction mixture was heated to 80° C. for 4 hours. After cooling, an aqueous polymer solution was obtained.

The electrolyte baths containing the polymers prepared according to Preparation Examples 6 to 23 as additives were subjected to the following test method.

Application Examples 1 to 11

Alkaline Electrolytes

Test Methods Used
(a) Rapid Bubble Test
In order to assess the formation of bubbles, the bubble test according to EP 1 114 206 B1 was used. In the bubble test, the following basic electrolyte was used:
15.6 g/L zinc
127 g/L NaOH
15 mL/L Protolux Modifier 2×™ conc. (Atotech Deutschland GmbH)
4 mL/L Protolux 3000 Additive™ (Atotech Deutschland GmbH)
0.66 g/L polymers according to Preparation Examples 6 to 17 or comparative polymers (as a solid), respectively
10 mg/L 1-benzyl-3-carbamoylpyridinium chloride
(b) Test for Layer Thickness Distribution
The following basic electrolyte was used:
15.6 g/L zinc
127 g/L NaOH
15 mL/L Protolux Modifier 2×™ conc. (Atotech Deutschland GmbH)
4 mL/L Protolux 3000 Additive™ (Atotech Deutschland GmbH)
0.66 g/L polymers according to Preparation Examples 6 to 17 or comparative polymers (as a solid), respectively
10 mg/L 1-benzyl-3-carbamoylpyridinium chloride
250 mL of the solution were filled into a Hull cell. A zinc anode served as the anode. The cathode sheet was coated for 15 minutes at 1 A room temperature. After completion of the coating, the sheet was rinsed, and brightened for 10 s in nitric acid (0.3 vol.-%), rinsed again and dried under pressurized air. The measurement of layer thickness was performed at two spots at 3 cm from the lower margin and 2.5 cm from the right and left side margin at high current density (2.8 A/d², HCD) and low current density (0.5 A/dm², LCD). It was measured using XRF at four points at the respective position to keep measurement errors as low as possible. The layer thickness distribution corresponds to the ratio of the measured values for the layer thickness at high (HCD) and low current density (LCD), i.e. layer thickness=HCC)/LCD. The results obtained are summarized in Tables 1 and 2.

TABLE 1

Application Examples 1 to 9

| Ex. | Polymer according to Prep. ex. | Monomer A | Monomer B |
|---|---|---|---|
| 1 | 6 | (CH₃)₂N–CH₂CH₂–NH–C(=O)–NH–CH₂CH₂–N(CH₃)₂ | Cl–CH₂CH₂–O–CH₂CH₂–O–CH₂CH₂–Cl |
| 2 | 7 | (CH₃)₂N–CH₂CH₂–NH–C(=O)–NH–CH₂CH₂–N(CH₃)₂ | Cl–CH₂CH₂–O–CH₂CH₂–Cl |

TABLE 1-continued

Application Examples 1 to 9

| | | Structure A | Structure B |
|---|---|---|---|
| 3 | 8 | 1,3-bis(2-(dimethylamino)ethyl)urea | 1-chloro-2-(2-chloroethoxy)ethane |
| 4 | 10 | 1,3-bis(3-(dimethylamino)propyl)urea | 1-bromo-3-chloropropane |
| 5 | 11 | 1,3-bis(3-(dimethylamino)propyl)urea | 1-bromo-3-chloropropane |
| 6 | 12 | 1,3-bis(3-(dimethylamino)propyl)urea | 1-chloro-2-(2-chloroethoxy)ethane |
| 7 | 14 | 1,3-bis(3-(dimethylamino)propyl)urea | 1-chloro-2-(2-chloroethoxy)ethane |
| 8 | 15 | 1,3-bis(3-(dimethylamino)propyl)urea | 1-chloro-2-(2-chloroethoxy)ethane |

9 Comparative experiment: use of a polymer according to Preparation
Example 2.2 of EP 1 114 206 B1

| Ex. | A:B | Addition HCl | pH | HCD (μm) | LCD (μm) | HCD/LCD | Burning | Bubbles | Brightness |
|---|---|---|---|---|---|---|---|---|---|
| 1 | 4:3 | no | 10 | 6.9 | 3.5 | 2.0 | very strong | none | ++ |
| 2 | 4:3 | yes | 2 | 6.3 | 4.5 | 1.5 | very litte | none | ++ |
| 3 | 4:3 | no | 10 | 7.7 | 3.9 | 1.8 | very litte | none | ++ |
| 4 | 4:3 | yes | 2.5 | 5.4 | 2.8 | 1.9 | none | none | ++ |
| 5 | 5:4 | yes | 2.0 | 4.5 | 3.3 | 1.36 | none | none | ++ |
| 6 | 4:3 | no | 10 | 4.7 | 3.3 | 1.4 | none | none | ++ |
| 7 | 5:4 | no | 10 | 4.6 | 3.2 | 1.44 | none | none | ++ |
| 8 | 10:9 | no | 10 | 4.7 | 3.4 | 1.38 | none | none | ++ |
| 9 | | yes | 2.5 | 7.8 | 2.6 | 2.6 | strong | yes | + |

TABLE 2

Application Examples 9 to 11

| Ex. | Polymer according to Prep. ex. | Monomer A | Monomer B1 | Monomer B2 | A1:B1:B2 |
|---|---|---|---|---|---|
| 10 | 16 | (guanidine structure with NH, methylamino-propyl groups) | Cl–CH₂CH₂–O–CH₂CH₂–Cl | Cl–CH₂–CH(OH)–CH₂–Cl | 4:2:1 |
| 11 | 17 | (guanidine structure with NH, methylamino-propyl groups) | Cl–CH₂CH₂–O–CH₂CH₂–Cl | Cl–CH₂–CH(OH)–CH₂–Cl | 4:2:1 |

9 Comparative experiment: use of a polymer according to Preparation Example 2.2 of EP 1 114 206 B1

| Ex. | Addition HCl | pH | HCD (μm) | LCD (μm) | HCD/LCD | Burning | Bubbles | Brightness |
|---|---|---|---|---|---|---|---|---|
| 10 | no  | 12  | 6.1 | 3.0 | 2.0 | none   | no  | ++ |
| 11 | yes | 2.0 | 6.0 | 3.7 | 1.6 | none   | no  | +++ |
| 9  | yes | 2.5 | 7.8 | 2.6 | 2.6 | strong | yes | + |

Table 1 shows the layer thickness (and thus current efficiency), brightness, burnings and layer thickness distribution regarding the electrolytes according to the invention for deposition of a zinc layer. As can be seen from Table 1, the use of the polymers of the Formula I as additive in electroplating baths leads to better layer thickness distributions. The layer thickness distribution is the ratio of the layer thickness of the zinc layer in the high current density range (HCD) to the layer thickness in the low current density range (LCD), as shown in Table 1. The ratio having the value of 2.6 is with respect to Example 9 (prior art) the worst, whilst it amounts, using the additives according to the invention, to between 1.38 (Example 8) and 2.0 (Example 1). Furthermore, the burnings in the high current density range, as found in the case of commercial grain refiners (Example 9) are weaker, or do not exist anymore, respectively. Depending on the polarity of the dihalides used, the polymers must not or may not, respectively, have a higher degree of polymerization.

It was surprisingly found that the deposition results can be significantly influenced, or varied in a targeted way, respectively, by addition of further halide ion equivalents, which can be added more preferably by acidifying polymer of origin. Thus, it can be seen from Examples 1 and 2 that by addition of hydrochloric acid (approx. 2 equivalents per equivalent of polymer) on the one hand, the distribution of the electrolyte, and on the other hand, the tendency towards burnings are reduced. Thus, in particular, by addition of halide, an increase of the current efficiency in the low current density range is achieved. It is these much higher current efficiencies in the low current density range which are interesting for applications regarding barrel electrodepositions. The halide ions may be in form of the corresponding mineral acids, or by quaternization of the terminal tertiary amino functionalities using the corresponding alkyl halides, or by addition of alkali metal, earth alkali metal, zinc or ammonium halides, respectively. In this case, regarding the ammonium halides, besides the unsubstituted ammonium halide, also alkyl ammonium halides such as tetraalkylammoniumchloride or ammonium salts, e.g. as described in U.S. Pat. No. 3,960,677, may be used.

As can be seen from Table 2, by using mixed polymers, more bright zinc depositions can be obtained with, at the same time, improved distribution. Also in this case, by adding further halide ions (e.g. by addition of hydrochloric acid), an improvement of distribution on the one hand, and an improvement regarding brightness can be achieved on the other hand.

Application Examples 12 and 13

Alkaline Zinc-Nickel Electrolytes

Test Methods Used (c) Tests for Layer Thickness Distribution

The following basic electrolyte was used:

10 g/L zinc 2 g/L nickel 80 g/L triethanolamine

380/L tetraethylenpentamine 0.66 g/L additives according to Preparation Examples 6 to 17 or comparative polymers (as a solid substance), respectively 60 mg/L 1-benzyl-3-carboxyl-pyridinium-chloride 250 mL of the solution were filled into a Hull cell. A zinc anode served as the anode. The cathode sheet was coated for 15 minutes at 1 A room temperature. After completion of the coating, the sheet was rinsed, and brightened for 10 s in nitric acid (0.3 vol.-%), rinsed again and dried under pressurized air. The measurement of layer thickness was performed at two spots at 3 cm from the lower margin and 2.5 cm from the right and left side margin at high current density (2.8 A/d², HCD) and low current density (0.5 A/dm², LCD). It was measured using XRF at four points at the respective position to keep measurement errors as low as possible. The layer thickness distribution corresponds to the ratio of the measured values for the layer thickness at high (HCD) and low current density (LCD), i.e. layer thickness distribution=HCD/LCD. The results obtained are summarized in Table 3.

TABLE 3

Application Examples 12 and 13

| Ex. | Polymer | HCD (μm) | LCD (μm) | Ni assay [%] HCD | Ni assay [%] LCD | Brightness | Observation |
|---|---|---|---|---|---|---|---|
| 12 | Polymer according to Application Example 13 | 8.64 | 3.3 | 10.7 | 10.1 | +++ | Brightness throughout |
| 13 | Comparative example with Mirapol WT ™ (according to U.S. Pat. No. 5,435,898; col. 3, l. 17 et seq.) | 8.64 | 3.0 | 11.2 | 9.4 | ++ | Dull deposition at very low current densities |

Table 3 emphasizes the effect of the electrolyte compositions according to the present invention for zinc-nickel depositions. As can be seen from Table 3, a bright and uniform deposition can be obtained over the whole current density range. Using the known polymers Mirapol WT™ (Example 13), homogenous glossy layers are merely obtainable in high to middle current density ranges.

Application Examples 14 to 22

Acidic Zinc Electrolytes

Test Methods Used
(d) Test of Optical Properties
The following basic electrolyte was used:
58 g/L zinc chloride
180 g/L ammonium chloride
3.3 g/L sodium benzoate
2.6 g/L of an ethoxylated α-naphtol (molecular weight approx. 670 g/mol)
2.65 g/L of an alkylnaphthalene sodium sulfonate
1.24 g/L hydrochloric acid (33%)
2.0 g/L polymer or comparative polymer, respectively, according to Table 4 (as a 50% solution)
0.5 g/L chlorobenzaldehyde
Ammonia (30%) for adjusting the pH value to 5 to 7
250 mL of the solution were filled into a Hull cell. A zinc anode served as the anode. The cathode sheet was coated for 15 minutes at 1 A room temperature. After completion of the coating, the sheet was rinsed, and brightened for 10 s in nitric acid (0.3 vol.-%), rinsed again and dried under pressurized air. The optical properties of the sheet were assessed visually. The results obtained are summarized in Table 4.

TABLE 4

Application Examples 14 to 22

| Ex. | Monomer A | Monomer B | A:B | Addition HCl | pH | Brightness | Haze | Burning |
|---|---|---|---|---|---|---|---|---|
| 14 | (CH₃)₂N-(CH₂)₃-NH-C(=O)-NH-(CH₂)₃-N(CH₃)₂ | Cl-CH₂CH₂-O-CH₂CH₂-Cl | 2:1 | no | 12 | ++ | — | little |
| 15 | (CH₃)₂N-(CH₂)₃-NH-C(=O)-NH-(CH₂)₃-N(CH₃)₂ | Cl-CH₂CH₂-O-CH₂CH₂-Cl | 2:1 | yes | 2.0 | ++++ | — | little |
| 16 | (CH₃)₂N-(CH₂)₃-NH-C(=O)-NH-(CH₂)₃-N(CH₃)₂ | Cl-CH₂CH₂-O-CH₂CH₂-Cl | 4:3 | yes | 2.0 | +++ | — | little |
| 17 | (CH₃)₂N-(CH₂)₃-NH-C(=O)-NH-(CH₂)₃-N(CH₃)₂ | Br-(CH₂)₃-Cl | 2:1 | yes | 2.0 | +++ | — | little |
| 18 | (CH₃)₂N-(CH₂)₃-NH-C(=O)-NH-(CH₂)₃-N(CH₃)₂ | Br-(CH₂)₄-Cl | 5:4 | no | 12 | +++ | — | little |
| 19 | (CH₃)₂N-(CH₂)₃-NH-C(=NH)-NH-(CH₂)₃-N(CH₃)₂ | Cl-CH₂CH₂-O-CH₂CH₂-O-CH₂CH₂-Cl | 4:3 | no | 12 | ++++ | — | none |
| 20 | (CH₃)₂N-(CH₂)₃-NH-C(=NH)-NH-C(=NH)-NH-(CH₂)₃-N(CH₃)₂ | Cl-CH₂CH₂-O-CH₂CH₂-Cl | 4:3 | no | 12 | +++ | — | little |

TABLE 4-continued

Application Examples 14 to 22

| Ex. | Monomer A | Monomer B | A:B | Addition HCl | pH | Brightness | Haze | Burning |
|---|---|---|---|---|---|---|---|---|
| 21 | 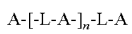 | | 4:3 | no | 12 | +++ | — | little |
| 22 | Comparative experiment using Mirapol WT ™ (according to US 5,435,898; col. 3, l. 17 et. seq.) | | | | | ++ | present | very strong |

Table 4 emphasizes that the burnings often occurring in conventional acidic zinc baths can be avoided by the polymer of the Formula I. As can be seen from Table 4, more glossy zinc depositions can be obtained with the polymers of the Formula I from weakly acidic ammonium containing baths than by using commercially available polymers. By addition of halides, e.g. in the form of hydrochloric acid, an improvement of the layer can be achieved (cf. Examples 14 and 15: higher gloss using a composition according to Example 15 containing chloride).

The invention claimed is:

1. Electrolyte bath for electrodeposition of a zinc or zinc alloy layer, wherein the electrolyte bath contains (i) zinc cations and optionally additional metal ions and (ii) a polymer of the following formula I $$A\text{-}[\text{-}L\text{-}A\text{-}]_n\text{-}L\text{-}A \quad (I)$$

wherein A represents a unit derived from a diamino compound of one of the following formulae II to VII

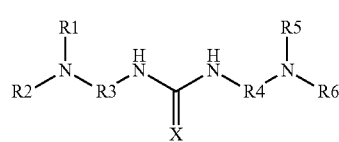
Formula II

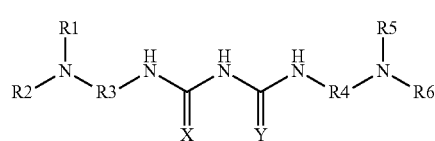
Formula III

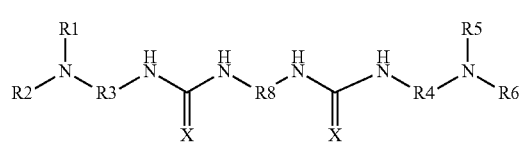
Formula IV

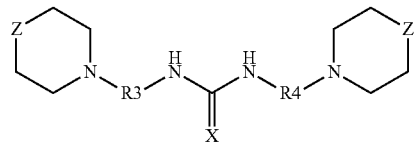
Formula V

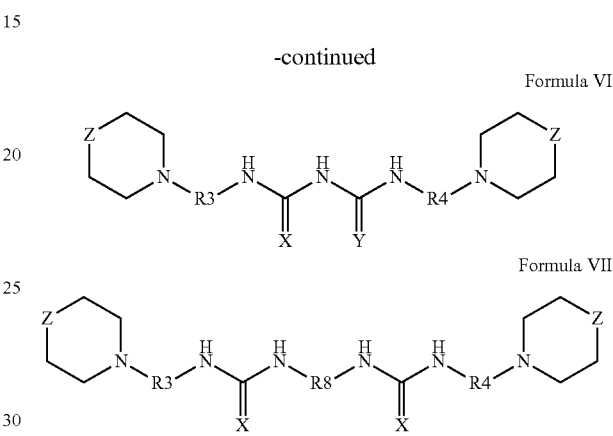
Formula VI

Formula VII wherein
X and Y each can be the same or different and represent O or NR, wherein R stands for H or $C_1$-$C_6$-alkyl,
Z each may be the same or different and represents O or S,
R1, R2, R5, and R6 each may be the same or different and represent a substituted or unsubstituted hydrocarbon residue with 1 to 10 carbon atoms, and
R3, R4, R8 each may be the same or different and represent $(CH_2)_p$, wherein p stands for an integer of 2 to 12 or for a $[CH_2CH_2O]_m$—$CH_2CH_2$— group, wherein m is between 1 and 40,
wherein L stands for a divalent residue, which is selected from the group consisting of
—$(CH_2)_g$—, wherein g is between 1 and 12;
—$CH_2$—$CH(OH)$—$CH_2$—; and
—$[CH_2CH_2O]_r$—$CH_2CH_2$—, wherein r is between 1 and 40;
wherein the single units A may be the same or different,
wherein the single units L may be the same or different,
wherein n represents an integer and n>0, and
wherein the polymer chain has units A at both ends.

2. Electrolyte bath according to claim 1, wherein R1, R2, R5, and R6 each may be the same or different and represent methyl, ethyl, hydroxyethyl or —$CH_2CH_2(OCH_2CH_2)_y$—OH, wherein y is between 0 and 4.

3. Electrolyte bath according to claim 1, wherein R3 and R4 may each be the same or different and represent an ethylene, propylene, —$(CH_2)_2$—O—$(CH_2)_2$— or —$(CH_2)_2$—O—$(CH_2)_2$—O—$(CH_2)_2$— group.

4. Electrolyte bath according to claim 1, wherein L represents a divalent residue, which is selected from the group consisting of —$(CH_2)_q$—, wherein q is between 2 and 4, —$(CH_2)_2$—O—$(CH_2)_2$— and —$(CH_2)_2$—O—$(CH_2)_2$—O—$(CH_2)_2$—.

5. Electrolyte bath according to claim 1, wherein the polymer is obtained by reacting one or more diamino compounds of formulae II to VII with one or more compounds of the following formula VIII, $$P-L-Q \qquad (VIII)$$

wherein L has the same meaning as in formula I and wherein P and Q each may be the same or different and represent halogens or pseudohalogens, and wherein the ratio $(n_A:n_B)$ of the total amount of substance used of the compound(s) of formulae II to VII $(n_A)$ to the total amount of substance of the compound(s) of formula VIII $(n_B)$ is at least 1.1:1.

6. Electrolyte bath according to claim 5, wherein the ratio $n_A:n_B$ is at least 1.3:1.

7. Electrolyte bath according to claim 5, wherein the halogens are selected from the group consisting of Cl, Br and I.

8. Electrolyte bath according to claim 5, wherein the pseudohalogens are selected from the group consisting of mesylate (OMs), triflate (OTf), nonaflate (ONf), and tosylate (OTs).

9. Electrolyte bath according to claim 1, wherein the polymer of formula I does not have organically bound halogen.

10. Electrolyte bath according to claim 1, wherein the polymer of formula I has a molecular weight of at least 500 g/mol.

11. Electrolyte bath according to claim 1, wherein the polymer of formula I is contained in an amount of 0.01 to 50 g/L.

12. Electrolyte bath according to claim 1, wherein halide ions have been added to the polymer of formula I.

13. Electrolyte bath according to claim 12, wherein the addition of halide ions has been carried out by addition of the corresponding mineral acids, by quaternization of a determinal tertiary amino group with the corresponding alkyl halides or by addition of alkaline, earth alkaline, zinc or ammonium halides.

14. Electrolyte bath according to claim 12, wherein the polymer of formula I has been acidified with about 2 equivalents of hydrochloric acid per equivalent of polymer.

15. Process for electrodeposition of glossy and planar zinc or zinc alloy coatings, wherein a substrate to be coated is immersed in the electrolyte bath according to claim 1 and a zinc or zinc alloy coating is deposited on the substrate by electroplating in the electrolyte bath.

* * * * *